United States Patent [19]

Suekane et al.

[11] Patent Number: 5,015,774

[45] Date of Patent: May 14, 1991

[54] PREPARATION PROCESS OF POLYOXYALKYLENE POLYAMINE HAVING TERMINAL SECONDARY AMINO GROUP

[75] Inventors: Ariko Suekane; Fumio Yamazaki, both of Nagoya; Takayoshi Masuda, Tokai, all of Japan

[73] Assignee: Mitsui Toatsu Chemicals, Inc., Tokyo, Japan

[21] Appl. No.: 436,001

[22] Filed: Nov. 14, 1989

[30] Foreign Application Priority Data

Nov. 16, 1988 [JP] Japan .................................. 63-287778
Dec. 22, 1988 [JP] Japan .................................. 63-321927

[51] Int. Cl.$^5$ ............................................ C07C 213/02
[52] U.S. Cl. ..................................... 564/475; 564/474; 564/480
[58] Field of Search ............................. 564/475, 474

[56] References Cited

U.S. PATENT DOCUMENTS

| 3,373,204 | 3/1968 | Hales et al. | 564/480 |
| 4,625,030 | 11/1986 | Best | 564/480 |
| 4,766,245 | 8/1988 | Larkin et al. | 564/475 |
| 4,855,505 | 8/1989 | Köll | 564/475 |

FOREIGN PATENT DOCUMENTS

| 677124 | 3/1966 | Belgium | 564/475 |
| 2127425 | 5/1990 | Japan | 564/475 |
| 1033912 | 6/1966 | United Kingdom | 564/474 |

*Primary Examiner*—Glennon H. Hollrah
*Assistant Examiner*—Susan P. Treanor
*Attorney, Agent, or Firm*—Burns, Doane, Swecker & Mathis

[57] ABSTRACT

A process for preparing polyoxyalkylene polyamine having secondary amino groups at the end of polymer chain by reaction of polyoxyalkylene polyol with primary amine is disclosed.

Polyoxyalkylene polyamine having higher content of the secondary amino groups can be obtained by using a catalyst containing (1) Ni and Zn, (2) Co and Zn, or (3) Ni, Co and Zn; by using a conventionally known catalyst in the presence of monohydric alcohol; or by using the catalyst containing (1) Ni and Zn, (2) Co and Zn, or (3) Ni, Co and Zn, in the presence of monohydric alcohol.

17 Claims, No Drawings

PREPARATION PROCESS OF POLYOXYALKYLENE POLYAMINE HAVING TERMINAL SECONDARY AMINO GROUP

BACKGROUND OF THE INVENTION

1. Field of the Invention

The present invention relates to a process for preparing a polyoxyalkylene polyamine having a terminal secondary amino group. More particularly, the invention relates to a process for preparing a polyoxyalkylene polyamine having a secondary amino group at the end of a polymer chain by the reaction of a polyoxyalkylene polyol with a primary amine which comprises conducting the reaction by using a catalyst containing (1) Ni and Zn, (2) Co and Zn, or (3) Ni, Co and Zn; by using a catalyst in the presence of a monohydric alcohol; and by using the catalyst containing (1) Ni and Zn, (2) Co and Zn, or (3) Ni, Co and Zn, respectively in the presence of the monohydric alcohol.

The polyoxyalkylene polyamine having amino groups at the end of polymer chain provides a polyurea by addition polymerization with polyisocyanate. Addition polymerization is carried out by processing methods such as reaction injection molding (RIM) to form polyurea base molded articles. The polyoxyalkylene polyamine is useful as a raw material for elastomers, flexible foams, rigid foams and other various plastics such as epoxy resin, polyamide and polyimide.

2. Description of the Prior Art

Processes have been known on the preparation of a polyoxyalkylene polyamine having an amino group at the end of the polymer chain by reacting polyoxyalkylene polyol with ammonia or an amine. For example, Belgium Patent 677124 has proposed a preparation process for reacting a polyoxyalkylene polyol with ammonia at a high temperature under high pressure in the presence of a Raney metal catalyst. In the process, all terminal amines in the resulting polyoxyalkylene polyamine are primary amino groups. The polyoxyalkylene polyamine having primary amino groups at the end of polymer chain has too high reactivity with isocyanate groups. Hence the polyamine has a problem that urea reaction is difficult to control and a special and expensive high-speed machine is required for molding.

On the other hand, a polyoxyalkylene polyamine having secondary amino groups has mild reactivity with isocyanate group as compared with that having primary amino groups. Hence secondary amino groups have a large merit that the urea reaction can be controlled with ease and the molding operation is readily performed. As to the process for preparing the polyoxyalkylene polyamine having secondary amino groups, Japanese Patent Publication No. 7289/1970 discloses a process for reacting a polyalkylene polyol with ammonia or a primary amine at a high temperature under high pressure in the presence of a Raney metal catalyst. When the polyoxyalkylene polyol is reacted with ammonia alone, a polyoxyalkylene polyamine having secondary amino groups is formed by intermolecular reaction. Thus the secondary amino groups obtained are not located at the end of the polymer chain. The high possibility of the intermolecular condensed polyoxyalkylene polyamine is also present in the products prepared by reacting with primary amines. The present inventors have carried out experiments in order to prove the intermolecular condensation. As illustrated in Comparative Example 4 described below, secondary-amine based nitrogen was definitely detected in the products. However, the sum of the total amine value and the unreacted hydroxyl value was much lower than the hydroxyl value of the polyoxyalkylene polyol raw material, which result proved the presence of intermolecular condensed polyoxyalkylene polyamine.

Therefore, the secondary amine obtained by the above process is different in structure and composition from the polyoxyalkylene polyamine of this invention which has secondary amino groups at the end of polymer chain.

SUMMARY OF THE INVENTION

An object of this invention is, in a preparation process of a polyoxyalkylene polyamine having a secondary amino group at the end of polymer chain by reacting a polyoxyalkylene polyol with a primary amine, to provide a process for preparing the polyoxyalkylene polyamine having a high content of a terminal secondary amino group by inhibiting intermolecular condensation.

The present inventors have carried out an intensive investigation in order to achieve the above object. As a result, it has been found that selectivity of the secondary amine is improved by the addition of Zn to a Ni, Co or Ni-Co catalyst, that the selectivity of the secondary amine is also improved by using a conventionally known catalyst in the presence of a monohydric alcohol, and that the selectivity of the secondary amine is further enhanced by a synergistic effect when the above Ni/Co base catalyst containing Zn is used in combination with the monohydric alcohol. Thus, the present invention has been completed.

The aspect of this invention is a process for preparing the polyoxyalkylene polyamine having the terminal secondary amino group by reaction of the polyoxyalkylene polyol with the primary amine comprising conducting said reaction in the presence of a catalyst containing (1) Ni and Zn, (2) Co and Zn, or (3) Ni, Co and Zn (hereinafter abbreviated as process-1). This invention also provides a process for preparing the polyoxyalkylene polyamine having the terminal secondary amino group by reaction of the polyoxyalkylene polyol with the primary amine in the presence of a catalyst comprising conducting said reaction by using the monohydric alcohol (hereinafter abbreviated as process-2). This invention provides further a process for preparing the polyxoyalkylene polyamine having the terminal secondary amino group by reaction of the polyoxyalkylene polyol with the primary amine comprising conducting said reaction by using the catalyst containing (1) Ni and Zn, (2) Co and Zn, or (3) Ni, Co and Zn, respectively in the presence of the monohydric alcohol (hereinafter abbreviated as process-3).

The compound obtained by these processes can be effectively used for the raw material of plastics such as a polyurea resin which is prepared by reacting the polyoxyalkylene polyamine with polyisocyanate.

DESCRIPTION OF THE PREFERRED EMBODIMENTS

Suitable polyoxyalkylene polyols for use in the process of this invention have a functionality of 2 to 8 and an average molecular weight of 400 to 30000. The polyoxyalkylene polyol is prepared by addition polymerization of an alkyleneoxide to a starting material.

Exemplary starting material which may be used includes, for example, polyhydric alcohols such as ethylene glycol, diethylene glycol, propylene glycol, dipropylene glycol, 1,4-butylene glycol, glycerol, hexanetriol, trimethylolpropane, pentaerythritol, sorbitol and sucrose; polyhdric phenols and aminophenols such as bisphenol-A, bisphenol-F, dihydroxydiphenyl ether, dihydroxybiphenyl, hydroquinone, resorcinol, phloroglucinol, naphthalenediol and phenol-formaldehyde condensation product, aminophenol and aminonaphthol; and amino alcohols and amines such as methyldiethanolamine, ethyldiisopropanolamine, triethanolamine, ethylenediamine, hexamethylenediamine, bis(p-aminocyclohexyl)methane, aniline, toluidine, tolylenediamine, diphenylmethanediamine and naphthalenediamine. The starting material may be used singly or in combination.

Exemplary alkylene oxides which may be added to the starting material include, for example, ethylene oxide, propylene oxide, butylene oxide and styrene oxide. The alkylene oxide may be used singly or in combination. Further, polytetramethyleneether glycol obtained by ring-opening polymerization of tetrahydrofuran may be used. The polyoxyalkylene polyol obtained above may be used singly or in combination.

The primary amine for use in the process of this invention has usually from 1 to about 20 carbon atoms and includes, for example, alkyl amines such as methylamine, ethylamine, n-propylamine, isopropylamine, n-butylamine, isobutylamine, sec-butylamine, tert-butylamine, amylamine, hexylamine, heptylamine, octylamine, nonylamine, decylamine, dodecylamine (laurylamine), tetradecylamine (myristylamine), hexadecylamine (palmitylamine), octadecylamine (stearylamine) and oleylamine; substituted alkylamines such as $\beta$-aminopropyl methyl ether and $\beta$-aminopropyl ethyl ether; aralkyl amines such as benzylamine and p-methylbenzylamine; and alicyclic amines such as cyclopentylamine and cyclohexylamine. The primary amine may be used singly or in combination.

The catalyst for use in process-1 or process-3 of this invention contains (1) Ni and Zn, (2) Co and Zn, or (3) Ni, Co and Zn.

When Ni or Co is used singly or in combination, selectivity of the secondary amine is low. Improved selectivity can only be obtained by using Ni and/or Co in combination with Zn. These catalyst components are used in the state of metal or oxide. The proportion of these components is from 10 to 200 parts by weight, preferably from 30 to 100 parts by weight of Zn as oxide per 100 parts by weight of Ni and/or Co as metal. The component ratio of Ni to Co may be arbitrary in the three component system of Ni, Co and Zn. A small amount of metal compounds such as Cr compound and Mn compound may be added to these catalyst components. These catalyst components may also be supported on a carrier such as silica, alumina and diatomaceous earth. The preferred amount of the carrier is from 10 to 1000 parts by weight per 100 parts by weight of metal components of Ni and/or Co.

The catalyst for use in process-2 of this invention may be a conventionally known catalyst. Suitable catalysts which may be mentioned include, for example, supported type catalysts obtained by supporting Ni and/or Co on carriers such as diatomaceous earth and alumina, Ni and/or Co based Raney type catalysts, and Cu-Cr based catalysts. Supported type catalysts are one of the particularly preferred catalysts.

Remarkable improvement can be found on the selectivity of secondary amine in the presence of the monohydric alcohol at the reaction of a polyoxyalkylene polyol with a primary amine. Suitable monohydric alcohols for use are primary or secondary alcohols having from 1 to 20 carbon atoms.

Exemplary monohydric alcohols include, for example, alkyl alcohols such as methanol, ethanol, n-propyl alcohol, isobutyl alcohol, sec-butyl alcohol, amyl alcohol, hexyl alcohol, heptyl alcohol, octyl alcohol, nonyl alcohol and decyl alcohol; substituted alkyl alcohols such as $\beta$-hydroxypropyl methyl ether and $\beta$-hydroxypropyl ethyl ether; aralkyl alcohols such as benzyl alcohol, p-methylbenzyl alcohol and o-methylbenzyl alcohol; and cycloalkyl alcohols such as cyclopentyl alcohol and cyclohexyl alcohol. Generally, no particular limitation is imposed upon the structure of the monohydric alcohol for use in the process of this invention. The particularly preferred monohydric alcohol has the same number of carbon atoms and the same carbon bonding scheme as the primary amine.

The amount of the primary amine used for the process of this invention is determined depending upon the application. The amount is usually from 0.5 to 50 equivalents, preferably from 0.8 to 10 equivalents and most preferably from 1 to 5 equivalents per equivalent of the hydroxyl group.

In the process of this invention, the catalyst is used in an amount usually from 0.1 to 20% by weight, preferably from 0.3 to 10% by weight and most preferably from 0.5 to 5% by weight of the polyoxyalkylene polyol.

The amount of the monohydric alcohol for use in this invention is usually from 0.01 to 1 equivalent, preferably from 0.05 to 0.7 equivalent and most preferably from 0.1 to 0.5 equivalent per equivalent of the amine. Too small an amount of the monohydric alcohol exhibits no effect. On the other hand, too large an amount causes an unfavorable decrease in the conversion ratio of the polyoxyalkylene polyol.

No particular restriction is placed on the reaction conditions of this invention. The reaction is generally carried out at a temperature of from 150° to 280° C. under a pressure of from 20 to 150 kg/cm$^2$G for 1 to 20 hours, and preferably carried out at 180° to 250° C., under a pressure of from 30 to 100 kg/cm$^2$G for 5 to 10 hours. Hydrogen may be or may not be contained in the reaction system. A low reaction temperature unfavorably reduces reaction rate. On the other hand, too high a reaction temperature is disadvantageous because the polyoxyalkylene polyol tends to decompose.

After completing the reaction, the desired product, i.e., the polyoxyalkylene polyamine having the secondary amino group at the end of polymer chain, can be obtained by carrying out a suitable combination of post treatment procedures such as recovery of unreacted amine by evaporation, filtration of the catalyst, washing with water, and drying.

As mentioned above in detail, this invention provides a process for preparing polyoxyalkylene polyamine having terminal secondary amino groups by reaction of the polyoxyalkylene polyol with the primary amine. The polyoxyalkylene polyamine having a secondary amine content higher than conventional polyol can be obtained by conducting said reaction in the presence of the catalyst containing (1) Ni and Zn, (2) Co and Zn, or (3) Ni, Co and Zn. The polyoxyalkylene polyamine can also be obtained by using conventionally known hydrogenation-dehydrogenation catalysts in the presence of the monohydric alcohol. The polyoxyalkylenepolyamine having further increased content of the secondary amino group can be obtained by combination of the above two processes.

EXAMPLE

The present invention will hereinafter be illustrated by way of examples.

The catalysts used in the examples were prepared by the following methods.

CATALYST PREPARATION EXAMPLE 1

In 2600 ml of distilled water, 1200 g of nickel nitrate $Ni(NO_3)_2.6H_2O$ and 900 g of zinc nitrate $Zn(NO_3)_2.6H_2O$ was dissolved and heated to 80° C. (Solution-A). Separately, 1100 g of ammonium carbonate was dissolved in 2600 ml of distilled water and heated to 85° C. (Solution-B). Solution-B was added dropwise to Solution-A with good stirring over an hour and additionally aged for an hour. The precipitate thus formed was suction filtered, repeatedly washed with warm water to remove alkali, and dried at 110° to 120° C. for 15 hours. The dried cake was ground in a mortar, charged in a quartz tube, baked at 300° C. for 3 hours by using a tubular electric furnace and then reduced for an hour by introducing hydrogen. The amount of Ni-Zn catalyst obtained was 450 g.

CATALYST PREPARATION EXAMPLE 2

In a manner similar to Catalyst Preparation Example 1, Solution-A was prepared by dissolving 1200 g of nickel nitrate $Ni(NO_3)_2.6H_2O$ and 360 g of zinc nitrate $Zn(NO_3)_2.6H_2O$ in 2300 ml of distilled water, adding 145 g of diatomaceous earth and subsequently heating to 80° C. Solution-B was prepared by dissolving 1000 g of ammonium carbonate in 2300 ml of distilled water and heating to 85° C. Precipitation reaction, washing by water, drying, baking and reduction were successively carried out by the same procedures as in Catalyst Preparation Example 1.

The amount of Ni-Zn diatomaceous earth catalyst obtained was 455 g.

CATALYST PREPARATION EXAMPLE 3

In a manner similar to Catalyst Preparation Example 1, Solution-A was prepared by dissolving 1500 g of cobalt nitrate $Co(NO_3)_2.6H_2O$ and 410 g of zinc nitrate $Zn(NO_3)_2.6H_2O$ in 2600 ml of distilled water, followed by adding 120 g of diatomaceous earth and heating to 80° C. Solution-B was prepared by dissolving 1000 g of ammonium carbonate in 2600 ml of distilled water and heating to 85° C. Precipitation reaction, washing by water, drying, baking and reduction were successively carried out by the same procedures as in Catalyst Preparation Example 1.

The amount of Co-Zn distomaceous earth catalyst obtained was 483 g.

CATALYST PREPARATION EXAMPLE 4

In a manner similar to Catalyst Preparation Example 1, Solution-A was obtained by dissolving 1000 g of nickel nitrate $Ni(NO_3)_2.6H_2O$, 650 g of colbtalt nitrate $Co(NO_3)_2.6H_2O$ and 425 g of zinc nitrate $Zn(NO_3)_2.6H_2O$ in 2600 ml of distilled water, followed by adding 120 g of distomaceous earth and heating to 80° C. Solution-B was prepared by dissolving 1100 g of ammonium carbonate in 2600 ml of distilled water and heating to 85° C. Precipitation reaction, washing by water, drying, baking and reduction were successively carried out by the same procedures as in Catalyst Preparation Example 1. The amount of Ni-Co-Zn diatomaceous earth catalyst obtained was 510 g.

CATALYST PREPARATION EXAMPLE 5

In a manner similar to Catalyst Preparation Example 1, Solution-A was prepared by dissolving 1500 g of cobalt nitrate $Ni(NO_3)_2.6H_2O$ in 2600 ml of distilled water, adding 370 g of diatomaceous earth and subsequently heating to 80° C. Solution-B was prepared by dissolving 890 g of ammonium carbonate in 2300 ml of distilled water and subsequently heating to 85° C. Precipitation reaction, washing by water, drying, baking and reduction were successively carried out by the same procedures as in Catalyst Preparation Example 1. The amount of Ni diatomaceous earth catalyst thus obtained was 640 g.

CATALYST PREPARATION EXAMPLE 6

In a manner similar to Catalyst Preparation Example 1, Solution-A was prepared by dissolving 1800 g of cobalt nitrate $Co(NO_3)_2.6H_2O$ in 2600 ml of distilled water, adding 270 g of diatomaceous earth and subsequently heating to 80° C. Solution-B was prepared by dissolving 1000 g of ammonium carbonate in 2000 ml of distilled water and heating to 85° C. Precipitation reaction, washing by water, drying, baking and reduction were carried out by the same procedures as in Catalyst Preparation Example 1. The amount of Co diatomaceous earth catalyst thus obtained was 600 g.

EXAMPLE 1

To a 200 ml high pressure autoclave, 5 g of Ni-Zn catalyst of Catalyst Preparation Example 1 containing 50% by weight of Ni and 50% by weight of ZnO, 100 g of polyoxypropylene triol obtained by addition polymerization of propylene oxide to glycerol and having a hydroxyl value of 33.4 mgKOH/g and an average molecular weight of 5040 (hereinafter abbreviated as Polyol-P) and 15.2 g of isopropylamine were successively charged. Nitrogen substitution was carried out 5 times at the pressure of 10 kg/cm$^2$G and then hydrogen was charged at the initial pressure of 50 kg/cm$^2$G. The mixture was heated to 220° C. with stirring and reacted for 8 hours. The pressure rose to 73 kg/cm$^2$G. After completing the reaction, the catalyst was removed by filtration. The filtrate was dried under reduced pressure to give a polyoxyalkylene polyamine having secondary amino groups at the ends of the polymer chain.

The product had a total amine value of 27.5 mgKOH/g, primary amine value of 1.20 mgKOH/g, secondary amine value of 26.1 mgKOH/g, tertiary amine value of 0.09 mgKOH/g, and a residual hydroxyl value of 4.30 mgKOH/g. Secondary amine selectivity of 94.9% and intermolecular bonding ratio of 3.1% were calculated from these values. The results indicated a very small existence of intermolecular bonds. The results are illustrated in Table 1.

Intermolecular bonding ratio is a ratio (%) of intermolecular secondary amine value to secondary amine value. Intermolecular secondary amine value is calculated by the following equation:

intermolecular secondary amine value = theoretical amine value − (total amine value + residual hydroxyl value)

EXAMPLE 2

The same procedures as described in Example 1 were carried out except that the Ni-Zn diatomaceous earth catalyst of Catalyst Preparation Example 2 containing 50% by weight of Ni, 20% by weight of ZnO and 30% by weight of diatomaceous earth was used in place of the Ni-Zn catalyst in Example 1. The reaction pressure was the same as in Example 1.

Results are illustrated in Table 1.

EXAMPLE 3

The same procedures as described in Example 1 were carried out except that the Co-Zn diatomaceous earth catalyst of Catalyst Preparation Example 3 containing 60% by weight of Co, 20% by weight of ZnO and 20% by weight of diatomaceous earth was used in place of the Ni-Zn catalyst in Example 1. The reaction was conducted under the pressure of 74 kg/cm$^2$G.

Results are illustrated in Table 1.

EXAMPLE 4

The same procedures as described in Example 1 were carried out except that the Ni-Co-Zn diatomaceous earth catalyst of Catalyst Preparation Example 4 containing 35% by weight of Ni, 25% by weight of Co, 20% by weight of ZnO and 20% by weight of diatomaceous earth was used in Example 1 in place of the Ni-Zn catalyst. The reaction pressure rose to 70 kg/cm$^2$G.

Results are illustrated in Table 1.

EXAMPLE 5

The same procedures as described in Example 1 were carried out except that polyoxypropylenepolyoxyethylene triol obtained by conducting addition polymerization of propylene oxide and successively ethylene oxide to glycerol (hereinafter abbreviated as Polyol-Q) was used in place of Polyol-P in Example 1. Polyol-Q had an ethylene oxide content of 15% by weight, hydroxyl value of 33.0 mgKOH/g and an average molecular weight of 5100. The reaction pressure rose to 72 kg/cm$^2$G.

Results are illustrated in Table 1.

EXAMPLE 6

The same procedures as described in Example 1 were carried out except that polytetramethyleneether glycol obtained by ring-opening polymerization of tetrahydrofuran (hereinafter abbreviated as Polyol-R) was used in place of Polyol-P in Example 1. Polyol-R had a hydroxyl value of 112 mgKOH/g and an average molecular weight of 1000. The reaction pressure rose to 70 kg/cm$^2$G. Results are illustrated in Table 1.

EXAMPLE 7

The same procedures as described in Example 1 were carried out except that n-butylamine was used in place of isopropylamine in Example 1. The pressure rose to 67 kg/cm$^2$G. Results are illustrated in Table 1.

EXAMPLE 8

The same procedures as described in Example 1 were carried out except that methylamine was used in place of isopropylamine in Example 1 and the methylamine was charged after charging the catalyst and Polyol-P and finishing nitrogen substitution. The reaction was conducted under the pressure of 85 kg/cm$^2$G. Results are illustrated in Table 1.

EXAMPLE 9

The same procedures as described in Example 1 were carried out except that benzylamine was used in place of isopropylamine in Example 1. The reaction pressure rose to 64 kg/cm$^2$G.

Results are illustrated in Table 1.

EXAMPLE 10

The same procedures as described in Example 1 were carried out except that cyclohexylamine was used in place of isopropylamine in Example 1. The reaction pressure rose to 70 kg/cm$^2$G.

Results are illustrated in Table 1.

COMPARATIVE EXAMPLE 1

The same procedures as described in example 1 were carried out except that the Ni diatomaceous earth catalyst of Catalyst Preparation Example 5 containing 50% by weight of Ni and 50% by weight of diatomaceous earth was used in place of the Ni-Zn catalyst in Example 1. The reaction pressure rose to 74 kg/cm$^2$G.

Results indicated low selectivity for secondary amine as illustrated in Table 1.

COMPARATIVE EXAMPLE 2

The same procedures as described in Example 1 were carried out except that the Co diatomaceous earth catalyst of Catalyst Preparation Example 6 containing 60% by weight of Co and 40% by weight of diatomaceous earth was used in place of the Ni-Zn catalyst in Example 1. The reaction pressure was the same as in Example 1. Results indicated low selectivity for secondary amine as illustrated in Table 1.

COMPARATIVE EXAMPLE 3

The same procedures as described in Example 1 were carried out except that ZnO was used in place of the Ni-Zn catalyst. The reaction pressure rose to 80 kg/cm$^2$G. However, no conversion of polyol to polyamine was observed as illustrated in Table 1.

COMPARATIVE EXAMPLE 4

The same procedures as described in Example 8 were carried out except that Raney Ni catalyst was used in place of the Ni-Zn catalyst and the reaction was conducted at 210° C. for 3 hours under the pressure of 80 kg/cm$^2$G.

The product obtained had a total amine value of 18.1 mgKOH/g, primary amine value of 3.40 mgKOH/g, secondary amine value of 14.7 mgKOH/g, tertiary amine value of 0 mgKOH/g and a residual hydroxyl value of 4.00 mgKOH/g. Consequently, the secondary amine value was composed of 3.70 mgKOH/g of terminal secondary amine and 11.0 mgKOH/g of secondary amine formed by intermolecular reaction. Intermolecular bonding ratio was 74.8%. Results also indicated low conversion ratio as illustrated in Table 1.

EXAMPLE 11

To a 200 ml high pressure autoclave, 4 g of the Ni diatomaceous earth catalyst of Catalyst Preparation Example 5 containing 50% by weight of Ni, 80 g of Polyol-P, 14.2 g of isopropylamine and 7.2 g of isopropyl alcohol were successively charged. Nitrogen substitution was carried out 5 times under the pressure of 10 kg/cm$^2$G and then hydrogen was charged at the initial pressure of 50 kg/cm$^2$G. The mixture was heated to 220° C. and reacted for 8 hours. The pressure rose to 80 kg/cm²G. After completing the reaction, the catalyst was removed by filtration. The filtrate was dried under reduced pressure to give polyoxyalkylene polyamine having secondary amino groups at the end of polymer chain.

Results are illustrated in Table 2.

EXAMPLE 12

The same procedures as described in Example 11 were carried out except that equivalent ratio of Polyol-P/isopropylamine/isopropyl alcohol was changed to 1/10/5. The pressure rose to 85 kg/cm²G. Results are illustrated in Table 2.

EXAMPLE 13

The same procedures as described in Example 11 were carried out except that equivalent ratio of Polyol-P/isopropylamine/isopropyl alcohol was changed to 1/20/5. The pressure rose to 92 kg/cm²G. Results are illustrated in Table 2.

EXAMPLE 14

The same procedures as described in Example 11 were carried out except that Polyol-Q was used in place of Polyol-P. The pressure was the same as in Example 11. Results are illustrated in Table 2.

EXAMPLE 15

The same procedures as described in Example 11 were carried out except that Polyol-R was used in place of Polyol-P. The pressure was the same as in Example 11. Results are illustrated in Table 2.

EXAMPLE 16

The same procedures as described in Example 11 were carried out except that n-butylamine and n-butyl alcohol were used respectively in place of isopropylamine and isopropyl alcohol and the reaction was conducted for 10 hours. The pressure rose to 78 kg/cm²G. Results are illustrated in Table 2.

EXAMPLE 17

The same procedures as described in Example 11 were carried out except that ethylamine and ethanol were used respectively in place of isopropylamine and isopropyl alcohol. The pressure rose to 82 kg/cm²G. Results are illustrated in Table 2.

EXAMPLE 18

The same procedures as described in Example 11 were carried out except that octanol was used in place of isopropyl alcohol. The pressure rose to 73 kg/cm²G. Results are illustrated in Table 2.

COMPARATIVE EXAMPLE 5

The same procedures as described in Example 11 were carried out without using isopropyl alcohol. The reaction was conducted under the pressure of 75 kg/cm²G.

Results indicated low selectivity for secondary amine as illustrated in Table 2.

COMPARATIVE EXAMPLE 6

The same procedures as described in Example 12 were carried out without using isopropyl alcohol. The reaction was conducted under the pressure of 88 kg/cm²G.

Results indicated low selectivity for secondary amine as illustrated in Table 2.

EXAMPLE 19

The same procedures as described in Example 16 were carried out except that the Ni-Zn catalyst of Catalyst Preparation Example 1 was used in place of the Ni diatomaceous earth catalyst and the reaction was conducted for 8 hours under the pressure of 73 kg/cm²G. Results are illustrated in Table 3.

TABLE 1

| Example or Comparative Example | POAP (A) | Amine (B) | Equivalent Ratio A/B | Catalyst | Catalyst Amount (wt %) | Reaction Condition Temperature (°C.) | Time (hr) | Pressure (kg/cm²G) | Conversion Ratio (%) | diatomaceous earth Amine Selectivity (%) | Intermolecular Bonding Ratio (%) |
|---|---|---|---|---|---|---|---|---|---|---|---|
| Ex. 1 | Polyol-P | Isopropylamine | 1/5 | Ni—Zn | 5 | 220 | 8 | 73 | 84.4 | 94.9 | 3.1 |
| Ex. 2 | Polyol-P | Isopropylamine | 1/5 | Ni—Zn-diatomaceous earth | 5 | 220 | 8 | 73 | 88.2 | 95.6 | 3.5 |
| Ex. 3 | Polyol-P | Isopropylamine | 1/5 | Co—Zn-diatomaceous earth | 5 | 220 | 8 | 74 | 79.2 | 89.0 | 2.8 |
| Ex. 4 | Polyol-P | Isopropylamine | 1/5 | Ni—Co—Zn diatomaceous earth | 5 | 220 | 8 | 70 | 83.0 | 91.4 | 3.0 |
| Ex. 5 | Polyol-Q | Isopropylamine | 1/5 | Ni—Zn | 5 | 220 | 8 | 72 | 83.0 | 94.5 | 3.1 |
| Ex. 6 | Polyol-R | Isoipropylamine | 1/5 | Ni—Zn | 5 | 220 | 8 | 70 | 82.5 | 95.3 | 3.0 |
| Ex. 7 | Polyol-P | n-Butylamine | 1/5 | Ni—Zn | 5 | 220 | 8 | 67 | 85.3 | 93.0 | 3.4 |
| Ex. 8 | Polyol-P | Methylamine | 1/5 | Ni—Zn | 5 | 220 | 8 | 85 | 80.0 | 95.1 | 3.5 |
| Ex. 9 | Polyol-P | Benzylamine | 1/5 | Ni—Zn | 5 | 220 | 8 | 64 | 83.9 | 94.2 | 3.2 |
| Ex. 10 | Polyol-P | Cyclohexylamine | 1/5 | Ni—Zn | 5 | 220 | 8 | 70 | 82.1 | 93.9 | 3.1 |
| Compar. Ex. 1 | Polyol-P | Isopropyl amine | 1/5 | Ni-diatomaceous earth | 5 | 220 | 8 | 74 | 85.6 | 54.5 | 3.5 |

TABLE 1-continued

| Example or Comparative Example | POAP (A) | Amine (B) | Equivalent Ratio A/B | Catalyst | Catalyst Amount (wt %) | Temperature (°C.) | Time (hr) | Pressure (kg/cm²G) | Conversion Ratio (%) | diatomaceous earth Amine Selectivity (%) | Intermolecular Bonding Ratio (%) |
|---|---|---|---|---|---|---|---|---|---|---|---|
| Compar. Ex. 2 | Polyol-P | Isopropylamine | 1/5 | Co-earth | 5 | 220 | 8 | 73 | 84.6 | 55.6 | 3.4 |
| Compar. Ex. 3 | Polyol-P | Isopropylamine | 1/5 | ZnO | 5 | 220 | 8 | 80 | 0 | 0 | — |
| Compar. Ex. 4 | Polyol-P | Methylamine | 1/5 | Raney Ni | 5 | 210 | 3 | 80 | 54.7 | 81.2 | 74.8 |

Note:
POAP; Polyoxyalkylene polyol
Polyol-P; Polyoxypropylene triol hydroxyl value 33.4 mg/KOH/g, Average molecular weight 5040)
Polyol-Q; Polyoxypropylenepolyoxyethylene triol (Ethylene oxide content 15 wt %, Hydroxyl value 33.0 mg/KOH/g, Average molecular weight 5100)
Polyol-R; Polytetramethyleneether glycol (Hydroxyl value 112 mg/KOH/g, Average molecular weight 1000)
Catalyst Amount: wt % to POAP
Conversion Ratio; Proportion of total amine value to the theoretical amine value
Secondary Amine Selectivity; Proportion of secondary amine value to the total amine value.
Intermolecular Bonding Ratio; Proportion of intermolecular secondary amine value to secondary amine value.

TABLE 2

| Example or Comparative Example | POAP (A) | Primary Amine (B) | Alcohol (C) | Equivalent Ratio A/B/C | Temperature (°C.) | Time (hr) | Pressure (kg/cm²G) | Conversion Ratio (%) | Secondary Amine Selectivity (%) | Intermolecular Bonding Ratio (%) |
|---|---|---|---|---|---|---|---|---|---|---|
| Ex. 11 | Polyol-P | Isopropylamine | Isopropyl alcohol | 1/5/2.5 | 220 | 8 | 80 | 75.2 | 75.7 | 2.5 |
| Ex. 13 | Polyol-P | Isopropylamine | Isopropyl alcohol | 1/10/5 | 220 | 8 | 85 | 80.6 | 74.9 | 2.8 |
| Ex. 13 | Polyol-P | Isopropylamine | Isopropyl alcohol | 1/20/5 | 220 | 8 | 92 | 90.8 | 72.3 | 2.4 |
| Ex. 14 | Polyol-Q | Isopropylamine | Isopropyl alcohol | 1/5/2.5 | 220 | 8 | 80 | 82.5 | 75.8 | 2.3 |
| Ex. 15 | Polyol-R | Isopropyl amine | Isopropyl alcohol | 1/5/2.5 | 220 | 8 | 80 | 85.0 | 74.8 | 2.8 |
| Ex. 16 | Polyol-P | n-Butylamine | n-Butyl alcohol | 1/5/2.5 | 220 | 10 | 78 | 78.5 | 75.0 | 2.5 |
| Ex. 17 | Polyol-P | Ethylamine | Ethanol | 1/5/2.5 | 220 | 8 | 82 | 79.3 | 70.5 | 1.9 |
| Ex. 18 | Polyol-P | Isopropylamine | Octanol | 1/5/2.5 | 220 | 8 | 73 | 74.0 | 76.7 | 2.5 |
| Compar. Ex. 5 | Polyol-P | Isopropylamine | — | 1/5/0 | 220 | 8 | 75 | 92.2 | 58.9 | 3.2 |
| Compar. Ex. 6 | Polyol-P | Isopropylamine | — | 1/10/0 | 220 | 8 | 88 | 95.9 | 50.4 | 2.3 |

Note:
POAP, Polyol-P, Polyol-Q, Polyol-R, Conversion Ratio, Secondary Amine Selectivity, and Intermolecular Bonding Ratio are the same as in Table 1.

TABLE 3

| Example | POAP (A) | Primary Amine (B) | Alcohol (C) | Equivalent Ratio A/B/C | Catalyst | Catalyst Amount (wt %) | Temperature (°C.) | Time (hr) | Pressure (kg/cm²G) | Conversion Ratio (%) | Secondary Amine Selectivity (%) | Intermolecular Bonding Ratio (%) |
|---|---|---|---|---|---|---|---|---|---|---|---|---|
| Ex. 19 | Polyol-P | n-Butylamine | n-Butyl Alcohol | 1/5/2.5 | Ni—Zn | 5 | 220 | 8 | 73 | 88.5 | 97.5 | 3.0 |
| Ex. 7 | Polyol-P | n-Butyl amine | — | 1/5/0 | Ni—Zn | 5 | 220 | 8 | 67 | 85.3 | 93.0 | 3.4 |
| Ex. 16 | Polyol P | n-Butyl amine | n-Butyl Alcohol | 1/5/2.5 | Ni-diatomaceous earth | 5 | 220 | 10 | 78 | 78.5 | 75.0 | 2.3 |

Note:
POAP, Polyol-P, Catalyst Amount, Conversion Ratio, Secondary AMine Selectivity and Intermolecular Bonding Ratio are the same as in Table 1.

What is claimed is:
1. A process for the preparation of a polyoxyalkylene polyamine having a secondary amino group at the end of the polymer chain by reaction of a polyoxyalkylene polyol with a primary amine in the presence of a hy- drogenation-dehydrogenation catalyst and 0.01 to 1 equivalent primary or secondary monohydric alcohol per equivalent of the primary amine.

2. The process of claim 1, wherein the hydrogenation-dehydrogenation catalyst is selected from the group consisting of (1) Ni, (2) Co, (3) Ni and Co, (4) Ni and Zn, (5) Co and Zn, (6) Ni, Co and Zn, (7) Cu and Cr.

3. The process of claim 2 wherein the group consists of supporting Ni and/or Co on diatomaceous earth or alumina, Ni and/or Co-base Raney type catalysts and Cu-Cr-based catalysts.

4. The process of claim 2 wherein a ration of component in the catalyst (4), (5) or (6) is from 10 to 200 parts by weight of Zn as oxide per 100 parts by weight of Ni and/or Co as metal.

5. The process of claim 2 wherein the catalyst (4), (5) or (6) is supported on from 10 to 1000 parts by weight of a carrier per 100 parts by weight of a metal component of Ni, Co, or Ni and Co.

6. The process of claim 5 wherein the carrier is silica, alumina or diatomaceous earth.

7. The process of claim 1 wherein the catalyst is a Ni-carrier type catalyst.

8. The process of claim 1 wherein the catalyst is used in an amount from 0.1 to 20% by weight per weight of the polyoxyalkylene polyol.

9. The process of claim 1 wherein the monohydric alcohol has from 1 to 20 carbon atoms.

10. The process of claim 9 wherein the monohydric alcohol is a straight chain or a branched chain alkyl alcohol, aralkyl alcohol, or cycloalkyl alcohol.

11. The process of claim 10 wherein the alkyl alcohol is methyl alcohol, ethyl alcohol, n-propyl alcohol, isopropyl alcohol, n-butyl alcohol or isobutyl alcohol.

12. The process of claim 10 wherein the aralkyl alcohol is benzyl alcohol.

13. The process of claim 10 wherein the cycloalkyl alcohol is cyclohexyl alcohol.

14. The process of claim 1 wherein the monohydric alcohol has the same numbers of carbon atoms and the same carbon bonding scheme as the primary amine.

15. The process of claim 1 wherein the amount of the primary amine is from 0.5 to 50 equivalent per equivalent of hydroxyl group of the polyoxyalkylene polyol.

16. The process of claim 1 wherein the polyoxyalkylene polyol has functionality of from 2 to 8 and an average molecular weight of from 400 to 30000.

17. The process of claim 1 wherein the primary amine has from 1 to 20 carbon atoms.

* * * * *

UNITED STATES PATENT AND TRADEMARK OFFICE
CERTIFICATE OF CORRECTION

PATENT NO. : 5,015,774
DATED : May 14, 1991
INVENTOR(S) : Suekane et al.

It is certified that error appears in the above-identified patent and that said Letters Patent is hereby corrected as shown below:

On the title page: Item [30]
    In the Foreign Application Priority Data, amend "63-287778" to --63-287787--.

Signed and Sealed this

Twenty-eighth Day of December, 1993

*Attest:*

BRUCE LEHMAN

*Attesting Officer*     *Commissioner of Patents and Trademarks*